US 8,451,859 B2

United States Patent
Kim et al.

(10) Patent No.: US 8,451,859 B2
(45) Date of Patent: May 28, 2013

(54) PACKET TYPE RETRANSMISSION SYSTEM FOR DMB SERVICE AND RETRANSMISSION DEVICE OF DMB TERMINAL

(75) Inventors: Sang-Ho Kim, Hwaseong-si (KR); Jun-Ho Koh, Suwon-si (KR); Kyung-Ho Chae, Seoul (KR); Yun-Je Oh, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 882 days.

(21) Appl. No.: 11/384,723

(22) Filed: Mar. 20, 2006

(65) Prior Publication Data

US 2006/0209888 A1    Sep. 21, 2006

(30) Foreign Application Priority Data

Mar. 21, 2005    (KR) .......................... 10-2005-0023316

(51) Int. Cl.
*H04J 3/16*    (2006.01)
(52) U.S. Cl.
USPC ........................................................ 370/466
(58) Field of Classification Search
USPC ............ 370/466, 486, 432, 390, 352; 725/54, 725/122; 700/237; 455/3.06, 345, 448, 553.1; 709/218; 348/723
See application file for complete search history.

(56) References Cited

U.S. PATENT DOCUMENTS

| | | | | |
|---|---|---|---|---|
| 6,122,514 | A | * | 9/2000 | Spaur et al. ................... 455/448 |
| 6,557,031 | B1 | * | 4/2003 | Mimura et al. ............... 709/218 |
| 6,952,595 | B2 | * | 10/2005 | Ikedo et al. ................ 455/553.1 |
| 7,076,794 | B2 | * | 7/2006 | Lieberman et al. ........... 725/140 |
| 2004/0181811 | A1 | * | 9/2004 | Rakib ........................... 725/122 |
| 2005/0055714 | A1 | * | 3/2005 | Lee ................................. 725/54 |
| 2005/0152405 | A1 | * | 7/2005 | Yang ............................. 370/486 |
| 2005/0228536 | A1 | * | 10/2005 | Mohr et al. ................... 700/237 |
| 2006/0262227 | A1 | * | 11/2006 | Jeong ........................... 348/723 |
| 2007/0015486 | A1 | * | 1/2007 | Marlowe ...................... 455/345 |
| 2007/0082608 | A1 | * | 4/2007 | Nam ........................... 455/3.06 |

FOREIGN PATENT DOCUMENTS

| | | |
|---|---|---|
| KR | 2006-12510 | 2/2006 |
| KR | 2006-47047 | 5/2006 |
| KR | 2006-99223 | 9/2006 |

* cited by examiner

*Primary Examiner* — Mark Rinehart
*Assistant Examiner* — Gbemileke Onamuti
(74) *Attorney, Agent, or Firm* — Cha & Reiter, LLC

(57) ABSTRACT

A packet type retransmission system for DMB services includes a DMB device for receiving multimedia data from a content provider, for converting the multimedia data to DMB data for DMB transmission, and for transmitting the DMB data. A broadcasting transfer medium transfers the DMB data transmitted through the DMB device. A DMB-IP converter receives the DMB data transferred through the broadcasting transfer media and converts the DMB data to packet based data. An IP based multimedia transmitting device outputs the packet based multimedia data converted through the DMB-IP converter to user devices.

10 Claims, 4 Drawing Sheets

PACKET TYPE RETRANSMISSION SYSTEM FOR DMB SERVICE AND RETRANSMISSION DEVICE OF DMB TERMINAL

CLAIM OF PRIORITY

This application claims priority to an application entitled "Packet Type Retransmission System for DMB Service and Retransmission Device of DMB Terminal," filed with the Korean Intellectual Property Office on Mar. 21, 2005 and assigned Serial No. 2005-0023316, the contents of which are incorporated herein by reference.

BACKGROUND

1. Field of the Invention

The present invention relates to DMB (Digital Multimedia Broadcasting), and more particularly to a system and a device for providing a DMB service to a device not configured to support DMB.

2. Description of the Related Art

DMB is a system standard that the Republic of Korea is trying to establish for the first time in the world. DMB would provide multimedia broadcasting services including video based on a DAB (Digital Audio Broadcasting) (Eureka-147) system which is a digital radio broadcasting standard in Europe and which provides both high quality audio services and data services.

As shown in FIG. 1, the general DMB system includes a DMB device 11, satellites/ground-waves 12 and a DMB reception device 13-1, 13-2, and 13-3. The DMB broadcasting device 11 receives multimedia data from a content provider, converts the multimedia data to DMB data for DMB transmission, and transmits the DMB data to the satellites/ground-waves 12. The latter are media for transferring the DMB data transmitted through the DMB device 11 to the DMB reception devices 13-1, 13-2, and 13-3 which, in turn, output multimedia data.

The DMB device 11 in the illustrated embodiment includes a broadcasting center for receiving multimedia data from a content provider and for constituting DMB data for DMB transmission, a transmitter for transmitting the DMB data constituted in the broadcasting center, and a gap filter for retransmitting the DMB data so as to remove DMB shadow areas.

The DMB reception device 13-1, 13-2, 13-3 includes DMB terminals for vehicles and portable DMB terminals.

Since the DMB system of FIG. 1 includes both a satellite DMB and a terrestrial DMB, the transfer media 12 include a satellite and ground-waves.

In the DMB system, a DMB terminal is necessary in order to receive a DMB-based multimedia service. However, DMB terminals are expensive.

SUMMARY OF THE INVENTION

The present invention has been made to solve the above-mentioned problems occurring in the prior art.

DMB services are implemented, according to the present invention, through the use of conventional devices such as WLAN (Wireless Local Area Network) terminals which are already widely used, Bluetooth terminals, and 3G (generation) terminals providing a mobile network, which can process packet type data.

In one aspect, the present invention converts DMB data to packet type data in a packet type retransmission system to provide DMB services to a device which cannot receive DMB.

In another aspect, a packet type retransmission system can, by re-transmitting DMB services through a packet type network, reduce the delay resulting from the channel conversion in conventional DMB services.

A packet type retransmission system for DMB services addressing the above aspects includes a DMB device for receiving multimedia data from a content provider, for converting the multimedia data to DMB data for DMB transmission and for transmitting the DMB data. A broadcasting transfer medium transfers the DMB data transmitted through the DMB device. A DMB-IP converter receives the DMB data transferred through the broadcasting transfer media and converts the DMB data to packet based data. An IP based multimedia transmitting device outputs the packet based multimedia data converted through the DMB-IP converter to user devices.

In another realization, there is provided a retransmission device for a DMB terminal for receiving DMB services for packet type retransmission, the retransmission device including: a DMB receiver for receiving DMB data transferred through a broadcasting medium; a DMB transfer mode releasing section for releasing the DMB transfer mode in the DMB data received through the DMB receiver and for outputting MPEG-2 TS; an IP streamer for IP streaming the MPEG-2 TS output from the DMB transfer mode releasing section; and an IP based transmitter for transmitting IP streaming data transferred from the IP streamer.

BRIEF DESCRIPTION OF THE DRAWINGS

The above and other objects, features, and advantages of the present invention will be more apparent from the following detailed description taken in conjunction with the accompanying drawings, in which the same or similar elements are denoted by the same reference numerals throughout the several views.

DETAILED DESCRIPTION

In the following discussion, detailed description of known functions and configurations incorporated herein is omitted for clarity of presentation.

Figure 2:
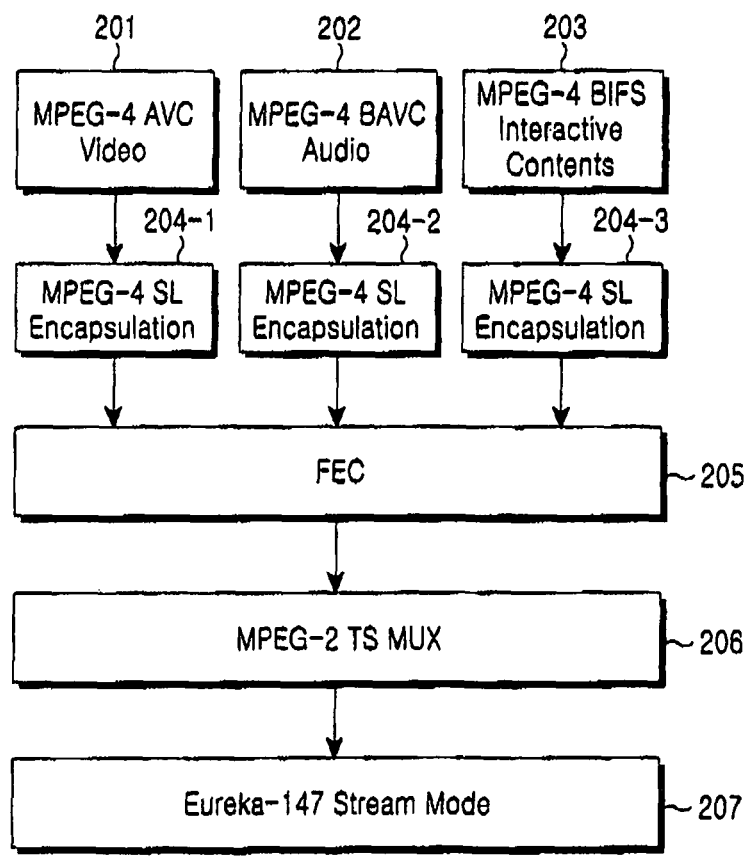
FIG. 2 is a block diagram showing a hierarchical structure for transmitting DMB data in a DMB system, according to the present invention.

FIG. 2 illustrates an example of a hierarchical structure for transmitting DMB data in a DMB system.

Video data are compressed to MPEG (Motion Picture Experts Group)-4 Part 10 AVC (Advanced Video Coding) (H.264) 201. H.264 is the most recent of currently known moving picture compression technologies, and operates with the highest efficiency. The efficiency of the H.264 compares remarkably well, particularly with conventional compression techniques, in compressing and transferring DMB data of low transfer rate, and data for display on small screens. H.264 is accordingly adopted as a video standard of the Korean ground-wave and satellite DMBs.

Audio data are classified into BSAC (Bit Sliced Arithmetic Coding) 202 of a terrestrial DMB and AAC+ (Advanced Audio Codec+) of a satellite DMB. The MPEG-4 BSAC method is one of audio compression techniques. The MPEG-4 BSAC enjoys compression efficiency similar to that of the other compression techniques and affords ease in varying the transfer rate. Terrestrial DMB is discussed further below in connection with a preferred embodiment.

The data information is compressed to MPEG-4 BIFS interactive contents format 203.

The video, audio, and data information are encapsulated (204-1, 204-2, 204-3) to MPEG-4 SLs (Synchronization Layers).

The encapsulated information undergoes an FEC (Forward Error Correction) process 205 for correcting transmission errors.

The FEC processed video, audio, and data information is multiplexed 206 into a TS (Transport Stream). The MPEG-2 TS packet includes a TS packet header and, as payload, a PES (Packetized Elementary Stream) packet. During demultiplexing that transfers the TS packet, a field included in the TS packet header, the PID (Packet Identifier) field represents the type of signals contained in a TS packet and is subsequently used during decoding of the PES packet.

The MPEG-2 TS multiplexed data is packed to Eureka-147 (European Research Coordination Agency project-147) stream mode 207, which is a transfer mode of a DMB, to constitute DMB data.

In accordance with the present invention, a device is provided for releasing the Eureka-147 stream mode 207 and for transferring the MPEG-2 TS to a terminal device capable of packet based data transfer but is not capable of DMB reception. The transfer is made through a packet based transfer protocol. In this manner, DMB data can be retransmitted as signals of other protocols. Although Ethernet is exemplified as a packet based data transfer protocol in the discussion to follow, the intended scope of the present invention is not limited thereto and an IEEE 1394, Bluetooth, a Zigbee device, or W-LAN can alternatively or additionally be used as the protocol.

Figure 3:
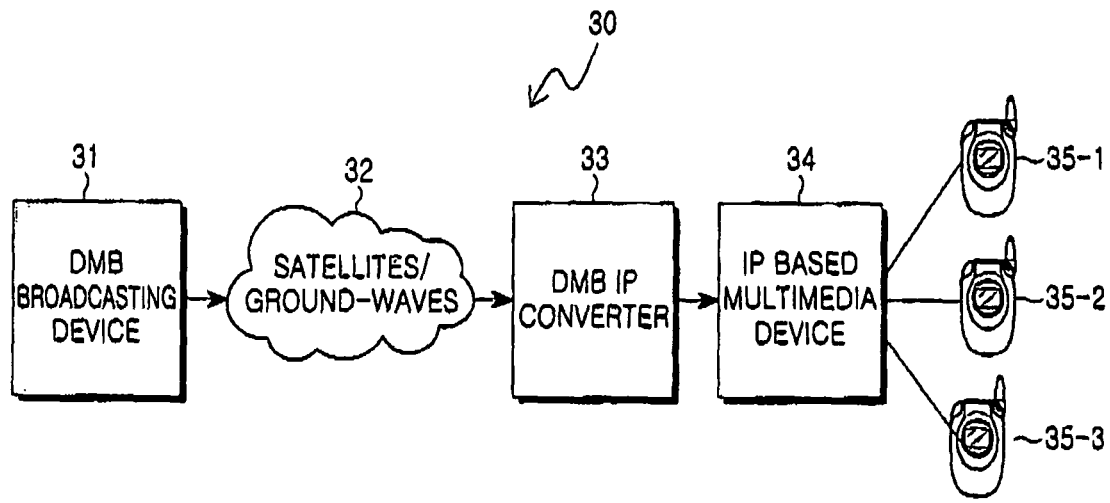
FIG. 3 is a flow diagram showing a packet type retransmission system for DMB services, according to the present invention.

FIG. 3 depicts, by way of illustrative and non-limitative example, a packet type retransmission system for DMB services 30, according to the present invention.

Figure 1:
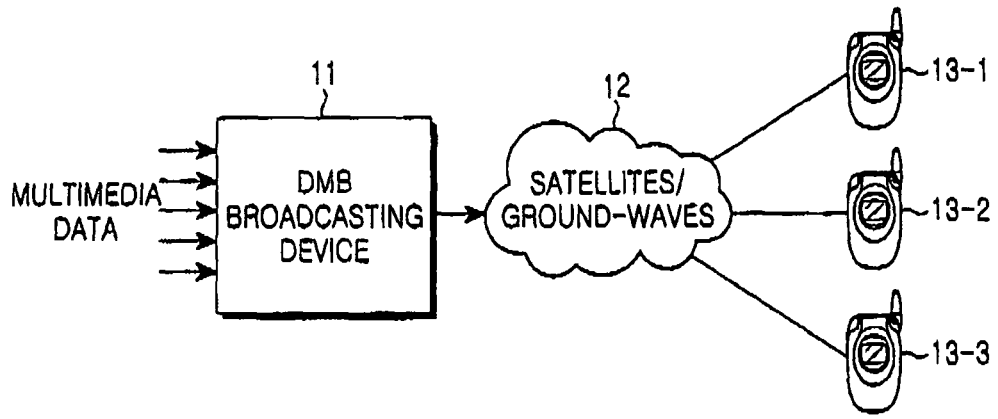
FIG. 1 is a flow diagram of a general DMB system.

Referring to FIG. 3, the system 30 includes a DMB device 31 and satellites/ground-waves 32 which may operate as described above regarding the device 11 and media 12 illustrated in FIG. 1. The DMB device 31 likewise may include the broadcasting center, transmitter and gap filter described above for device 11. The packet type retransmission system further includes a DMB-IP converter 33 for receiving the DMB data transferred through the satellites/ground-waves 32 and for converting the DMB data to packet based data. An IP (Internet Protocol) based multimedia transmitting device 34 outputs the packet based multimedia data converted through the DMB-IP converter to user devices 35-1, 35-2, 35-3.

Each of the user devices 35-1, 35-2, 35-3 is a terminal device non-compliant with DMB, i.e., which cannot directly receive the DMB data, and may be any device capable of processing packet based data.

Figure 4:
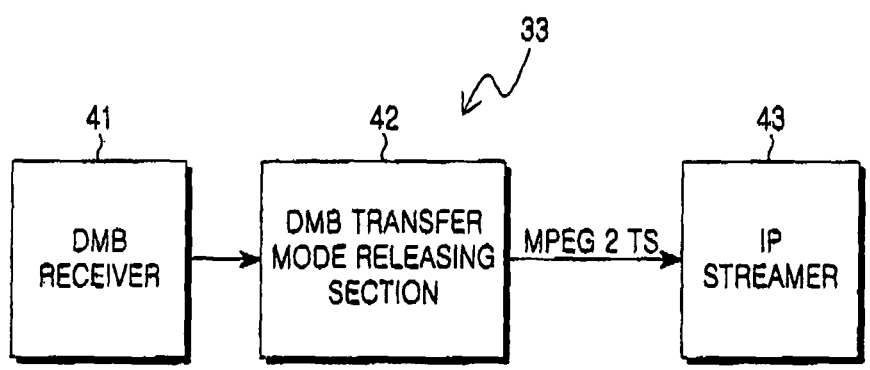
FIG. 4 is a flow diagram of a DMB-IP converter in a packet type retransmission system for DMB services, according to the present invention.

FIG. 4 shows the DMB-IP converter 33 in greater detail.

Referring to FIG. 4, the DMB-IP converter 33 includes a DMB receiver 41 for receiving DMB data transferred through the satellites/ground-waves 32, a DMB transfer mode releasing section 42 for releasing the DMB transfer mode in DMB data received through the DMB receiver 41 and for outputting MPEG-2 TS, and an IP streamer 43 for IP streaming the MPEG-2 TS output from the DMB transfer mode releasing section 42.

The DMB transfer mode releasing section 42 extracts the MPEG-2 TS from the input DMB data in real time. The IP streamer 43 converts the MPEG-2 TS to ASI (Adapter Support Interface) and IP streams it.

Generally, there are two ways of IP streaming H.264 based multimedia data. One is to make the MPEG-2 TS and then to insulate it in an IP (ETSI TS 101 154: version on November 2004), and the other utilizes a different streaming method (ETSI TS 102 005 newly registered on November 2004).

The H.264 data are, according to the present invention, preferably transferred by the first method, with the H.264 data carried in the MPEG-2 TS.

Figure 5:
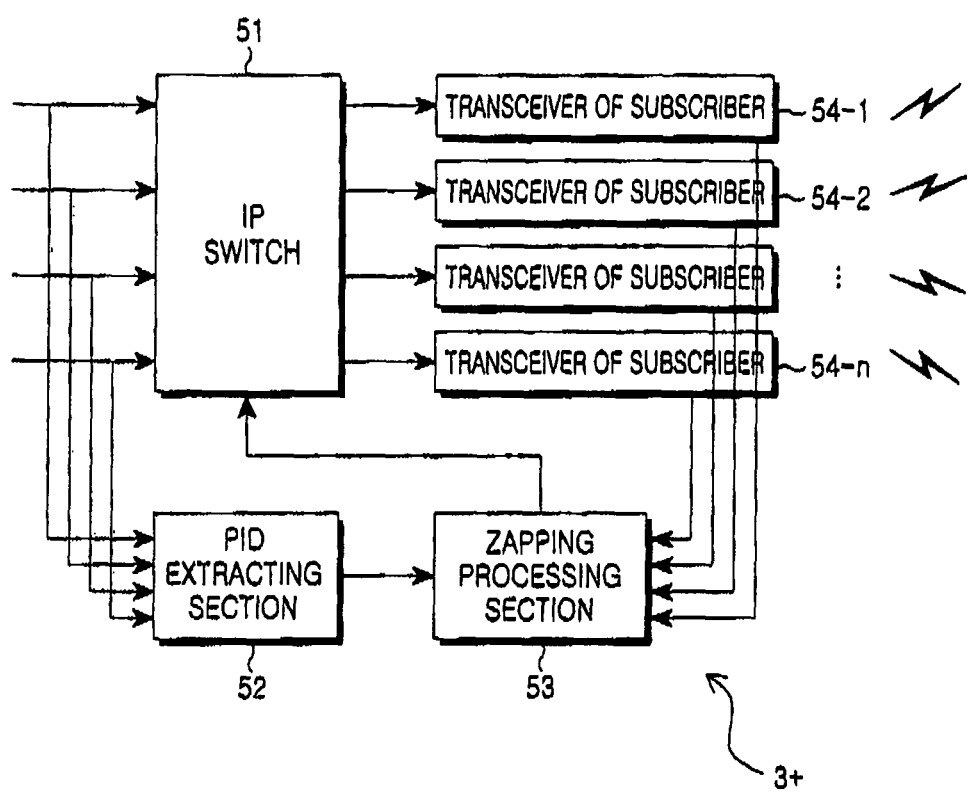
FIG. 5 is a block diagram of an IP based multimedia transmitter in a packet type retransmission system for DMB services, according to the present invention.

Referring to FIG. 5, an exemplary IP based multimedia transmitter 34, according to the present invention, includes an IP switch 51, a PID extracting section 52, a zapping processing section 53, and transceivers 54-1 to 54-*n* of subscribers. The IP switch 51 receives IP streaming data from a DMB-IP converter 33 and switches to transceivers of subscribers according to the process result of the zapping processing section 53. The PID extracting section 52 extracts PID information from IP streaming data input to the IP switch 51. The zapping processing section 53 controls switching of the IP switch 51 using the PID information extracted by the PID extracting section and the channel selection information of subscribers input through transceivers 54-1 to 54-*n* of subscribers. The transceivers 54-1 to 54-*n* of subscribers transfer multimedia data of subscribers received from the IP switch 51 to the subscriber devices 35-1, 35-2, 35-3, and transfer the channel selection information of the subscriber devices to the zapping processing section 53.

In the FIG. 5 configuration, the transceivers 54-1 to 54-*n*, especially, can be implemented differently as to transfer protocol or media. The transceivers 54-1 to 54-*n* can, for example, be realized by using an interface unit according to IEEE 1394 device, a Bluetooth transmitter, a Residential Ethernet unit, a Zigbee device, W-LAN equipment or any other known and suitable device.

The packet type retransmission system 30 is a device that can IP packetize the entire DMB channel for serving according to the selection of the subscriber devices 35-1, 35-2, 35-3. If, for instance, the DMB channel has a bandwidth of about 600 Kb, a bandwidth of about 24 Mb is sufficient even if about forty image channels are assumed to be provided.

Channel changing, in addition, is enhanced. In particular, all channels are IP packetized, and buffered, with only a remarkably short delay time when compared with the delay time (about six seconds) according to interleaving/deinterleaving performed when channels are changed in a conventional DMB terminal.

In another preferred embodiment of the present invention, a DMB terminal that has received DMB information shares it with general terminals.

Figure 6:
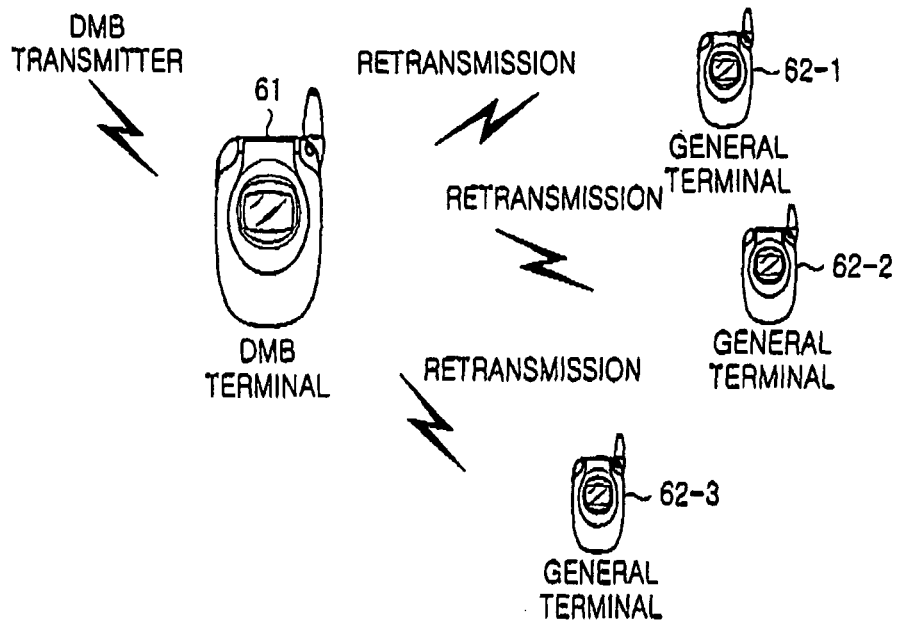
FIG. 6 is a flow diagram of a preferred embodiment for packet type retransmission by a DMB terminal in DMB services, according to the present invention.

FIG. 6 represents packet type retransmission by a DMB terminal in a DMB service according to the present invention.

Although the system portrayed in FIGS. 3 through 5 retransmits all DMB channels, retransmission using a DMB terminal 61 is limited to the one channel the current DMB terminal receives. In particular, the DMB terminal 61 receives DMB data transmitted from a DMB transmitter, such as that in the DMB broadcasting device 31. The terminal 61 then performs retransmission to general terminals 62-1, 62-2, 62-3, which cannot receive DMB data.

Figure 7:
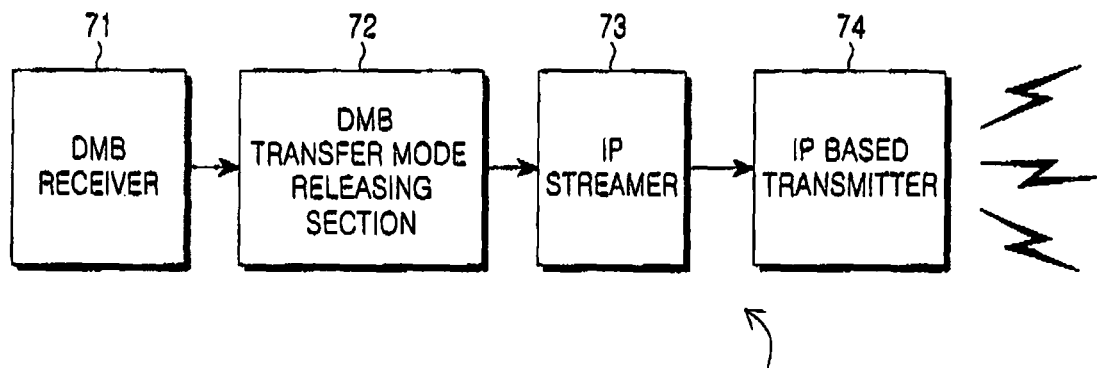
FIG. 7 is a block diagram of a retransmission device for packet type retransmission, performed by a DMB terminal, in DMB services according to the present invention.

For this, the DMB terminal 61 incorporates a retransmission device 70, which is shown in FIG. 7.

FIG. 7 represents an example of a retransmission device 70 for packet type retransmission, performed by the DMB terminal 61, in a DMB service according to the present invention.

The retransmission device 70 includes a DMB receiver 71 for receiving DMB data transferred through the satellites/ground-waves 32, a DMB transfer mode releasing section 72 for releasing the DMB transfer mode in DMB data received through the DMB receiver 71 and for outputting MPEG-2 TS, an IP streamer 73 for IP streaming the MPEG-2 TS output from the DMB transfer mode releasing section 72, and an IP based transmitter 74 for transmitting IP streaming data transferred from the IP streamer 73.

The IP based transmitter 74, especially, can be constructed differently according to transfer protocol or media. In particular, the IP based transmitter 74 can be realized in various ways, for example, by using an interface unit compatible with any of an IEEE 1394 unit, a Bluetooth transmitter, a Residential Ethernet unit, a Zigbee device, or W-LAN equipment.

As mentioned above, the present invention can, by converting DMB data to packet type data, provide DMB services to a device which cannot receive DMB.

The present invention also can, by retransmitting DMB services through a packet type network, reduce the delay which would otherwise occur due to the channel conversion in conventional DMB services.

While the invention has been shown and described with reference to preferred embodiments thereof, it will be understood by those skilled in the art that various changes in form and details may be made therein without departing from the spirit and scope of the invention as defined by the appended claims.

What is claimed is:

1. A packet type retransmission system for providing Digital Multimedia Broadcasting (DMB) services to both DMB compliant and DMB non-compliant user devices, the system comprising:
   a Digital Multimedia Broadcasting to Internet Protocol (DMB-IP) converter for wirelessly receiving DMB data from a DMB broadcasting device through a satellite or ground-waves and for converting the received DMB data to DMB-converted IP packet data; and
   an IP based multimedia transmitting device for wirelessly retransmitting the DMB-converted IP packet data to DMB non-compliant handheld user devices that cannot directly receive DMB data, the DMB-converted IP packet data being converted through the DMB-IP converter prior to being retransmitted to the DMB non-compliant handheld user devices;
   wherein the IP based multimedia transmitting device comprises:
   an IP switch for receiving the DMB-converted IP packet data and for switching to transceivers of subscribers;
   a Packet Identifier (PID) extracting section for extracting PID information from the DMB-converted IP packet data input to the IP switch;
   a zapping processing section configured for controlling switching of the IP switch using the PID information extracted by the PID extracting section and DMB channel selection information of subscribers; and
   transceivers being configured for wirelessly transferring the DMB-converted IP packet data transferred through the IP switch to the DMB non-compliant handheld user devices and for transferring said DMB channel selection information to said zapping processing section.

2. The packet type retransmission system according to claim 1, wherein the DMB-IP converter comprises:
   a DMB receiver for wirelessly receiving the DMB data from the DMB broadcasting device through the satellite or the ground-waves;
   a DMB transfer mode releasing section for releasing a DMB transfer mode in the DMB data received through the DMB receiver and for outputting a Motion Picture Experts Group 2 Transport Stream (MPEG-2 TS); and
   an IP streamer for IP streaming the MPEG-2 TS output from the DMB transfer mode releasing section and for converting the MPEG-2 TS to the DMB-converted IP packet data.

3. The packet type retransmission system of claim 2, wherein said DMB transfer mode releasing section releases a Eureka-147 stream mode in the DMB data received through the DMB receiver.

4. A packet type retransmission system according to claim 1, wherein said transceiver is an Ethernet type device.

5. A packet type retransmission system according to claim 1, wherein said transceiver is a transceiver of IEEE 1394 type.

6. A packet type retransmission system according to claim 1, wherein said transceiver is a Zigbee type device.

7. A packet type retransmission system according to claim 1, wherein said transceiver is a device of Residential Ethernet type.

8. A packet type retransmission system according to claim 1, wherein said transceiver is a device of W-LAN type.

9. The system of claim 1, wherein said DMB data comprises multimedia data.

10. A DMB compliant handheld terminal including a retransmission device for a Digital Multimedia Broadcasting (DMB) compliant terminal, said device being configured for receiving DMB services for packet type retransmission to one or more DMB non-compliant handheld terminals, said retransmission device comprising:
    a DMB receiver for wirelessly receiving DMB data from a DMB broadcasting device through a satellite or ground-waves;
    a DMB transfer mode releasing section for releasing a DMB transfer mode in the DMB data received through the DMB receiver and for converting the DMB data that is output as a Motion Picture Experts Group 2 Transport Stream (MPEG-2 TS);
    an Internet Protocol (IP) streamer for IP streaming the MPEG-2 TS output from the DMB transfer mode releasing section; and
    an IP based multimedia transmitter for wirelessly retransmitting from the DMB compliant terminal the converted DMB data of the IP-streamed output to said one or more DMB non-compliant handheld terminals, wherein said one or more DMB non-compliant handheld terminals cannot directly receive DMB data;
    wherein the IP based multimedia transmitter that retransmits converted DMB data to non-DMB compliant handheld terminals comprises a handheld portable DMB device.

* * * * *